US011176458B2

(12) United States Patent
Chen et al.

(10) Patent No.: US 11,176,458 B2
(45) Date of Patent: Nov. 16, 2021

(54) OPTIMIZATION OF OVER-THE-AIR FILE DISTRIBUTION FOR CONNECTED CARS BASED UPON A HEURISTIC SCHEDULING ALGORITHM

(71) Applicant: AT&T Intellectual Property I, L.P., Atlanta, GA (US)

(72) Inventors: Jie Chen, Watchung, NJ (US); Sichong Guan, Alpharetta, GA (US); Wenjie Zhao, Princeton, NJ (US); Laurie Bigler, Lafayette, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 193 days.

(21) Appl. No.: 16/449,583

(22) Filed: Jun. 24, 2019

(65) Prior Publication Data

US 2019/0311270 A1 Oct. 10, 2019

Related U.S. Application Data

(63) Continuation of application No. 15/379,880, filed on Dec. 15, 2016, now Pat. No. 10,332,006.

(51) Int. Cl.
*H04L 29/08* (2006.01)
*H04W 8/24* (2009.01)
(Continued)

(52) U.S. Cl.
CPC .............. *G06N 5/003* (2013.01); *G06F 8/61* (2013.01); *G06F 8/65* (2013.01); *H04L 67/06* (2013.01);
(Continued)

(58) Field of Classification Search
CPC ... G06F 8/65; G06F 8/61; H04L 67/34; H04L 67/12; H04L 67/325; H04L 67/06; H04W 4/40; H04W 8/245
See application file for complete search history.

(56) References Cited

U.S. PATENT DOCUMENTS 8,326,267 B2 12/2012 Abichandani et al.
8,589,908 B2 11/2013 Subbakrishna et al.
(Continued)

FOREIGN PATENT DOCUMENTS

CN 101420431 4/2009
CN 105094916 11/2015
(Continued)

OTHER PUBLICATIONS

Asaduzzaman, Saikat, "Analysis of Automotive Cybersecurity," Master's Thesis in Information Systems Science, Turku School of Economics, Apr. 30, 2016.
(Continued)

*Primary Examiner* — Kevin T Bates
*Assistant Examiner* — Lesa M Kennedy
(74) *Attorney, Agent, or Firm* — Hartman & Citrin LLC

(57) ABSTRACT

Concepts and technologies disclosed herein are directed to the optimization of over-the-air ("OTA") file distribution for connected cars based upon a heuristic scheduling algorithm. A schedule provided by the heuristic scheduling algorithm is designed to distribute OTA data flow to connected cars over the network (geographically) and over a scheduling time horizon (timely), and is capable of reducing the negative impact of OTA file updates on overall wireless network performance. This schedule is created based upon historical statistics associated with connected car driving patterns and simulations of connected car-specific OTA traffic over the network. By leveraging connected cars that connect to different cells at different times based upon driving patterns, the heuristic scheduling algorithm is effective in reducing OTA impact on the network.

17 Claims, 8 Drawing Sheets

(51) Int. Cl.
*H04W 4/40* (2018.01)
*G06N 5/00* (2006.01)
*H04W 4/50* (2018.01)
*G06F 8/61* (2018.01)
*G06F 8/65* (2018.01)

(52) U.S. Cl.
CPC ............ *H04L 67/12* (2013.01); *H04L 67/325* (2013.01); *H04L 67/34* (2013.01); *H04W 4/50* (2018.02); *H04W 8/245* (2013.01); *H04W 4/40* (2018.02)

(56) References Cited

U.S. PATENT DOCUMENTS

| | | | |
|---|---|---|---|
| 8,589,910 | B2 | 11/2013 | Zubas et al. |
| 8,626,143 | B2 | 1/2014 | Haughn |
| 8,868,696 | B2 | 10/2014 | Lewis et al. |
| 9,020,487 | B2 | 4/2015 | Brisebois et al. |
| 9,148,744 | B2 | 9/2015 | Velusamy et al. |
| 9,332,424 | B2 | 5/2016 | Logan et al. |
| 2004/0098421 | A1* | 5/2004 | Peng ............... G06F 8/61 |
| 2004/0235478 | A1 | 11/2004 | Lindquist |
| 2008/0140278 | A1 | 6/2008 | Breed |
| 2009/0075641 | A1 | 3/2009 | Guven et al. |
| 2009/0100417 | A1 | 4/2009 | Bolanowski et al. |
| 2010/0173622 | A1* | 7/2010 | Maurya ............. G06F 8/65 455/419 |
| 2010/0175062 | A1 | 7/2010 | Kim |
| 2011/0164562 | A1 | 7/2011 | Qui |
| 2011/0191764 | A1 | 8/2011 | Piorecki |
| 2011/0200052 | A1 | 8/2011 | Mungo et al. |
| 2012/0231777 | A1 | 9/2012 | Lewis |
| 2013/0114422 | A1* | 5/2013 | Clark ............... H04N 21/26216 370/252 |
| 2013/0152069 | A1 | 6/2013 | Li |
| 2013/0217379 | A1* | 8/2013 | Kalke ............... H04M 3/42178 455/419 |
| 2014/0148175 | A1 | 5/2014 | Luo |
| 2014/0304699 | A1 | 10/2014 | He et al. |
| 2015/0169311 | A1* | 6/2015 | Dickerson ......... G06F 8/65 717/170 |
| 2016/0078576 | A1 | 3/2016 | Su et al. |
| 2016/0112864 | A1 | 4/2016 | Harber |
| 2016/0196132 | A1 | 7/2016 | Searle et al. |
| 2016/0259639 | A1 | 9/2016 | Blaschke et al. |
| 2016/0371077 | A1* | 12/2016 | Moeller ............. G06F 8/654 |

FOREIGN PATENT DOCUMENTS

| | | |
|---|---|---|
| EP | 2857965 | 4/2015 |
| EP | 2245829 | 1/2016 |
| KR | 100849301 | 7/2008 |
| WO | WO 01/54044 | 7/2001 |
| WO | WO 2009/074444 | 6/2009 |

OTHER PUBLICATIONS

Fouquet et al., "A Dynamic Component Model for Cyber Physical Systems," Proceedings of the 15$^{th}$ International ACM SIGSOFT Symposium on Component Based Software Engineering, Jul. 2012.

Thakor, Ravish H., "Smartphones and Android Internals," Master of Science in Computer Science Thesis, San Diego State University, Fall 2012.

Talebi, Sareh, "A Security Evaluation and Internal Penetration Testing of the CAN-bus," Master of Science Thesis in the program Networks and Distributed Systems, Oct. 2014.

U.S. Notice of Allowance dated Feb. 11, 2019 in U.S. Appl. No. 15/379,880.

* cited by examiner

OPTIMIZATION OF OVER-THE-AIR FILE DISTRIBUTION FOR CONNECTED CARS BASED UPON A HEURISTIC SCHEDULING ALGORITHM

CROSS-REFERENCE TO RELATED APPLICATIONS

This application is a continuation of and claims priority to U.S. patent application Ser. No. 15/379,880, entitled "Optimization of Over-The-Air File Distribution for Connected Cars Based Upon a Heuristic Scheduling Algorithm," filed Dec. 15, 2016, now U.S. Pat. No. 10,332,006, which is incorporated herein by reference in its entirety.

BACKGROUND

In recent years, mobile telecommunications operators have experienced a dramatic increase in traffic on their networks, and this trend will likely continue. This increase in traffic has been caused in part by the increased adoption of mobile devices such as smartphones and other mobile devices that rely on mobile telecommunications networks, and the migration of many customers from utilizing landline telecommunication services to utilizing mobile telecommunication services for their communications needs. To meet the demands of higher traffic and to improve the end user experience, mobile telecommunications operators are examining mechanisms by which to improve network efficiency, network capacity, and the end user experience, while keeping operational costs at a level conducive to maintaining competitive rates for the services they provide.

The interne of things ("IoT") is a concept of making physical objects, collectively "things," network addressable to facilitate interconnectivity for the exchange of data via a network, such as cellular network. The number of IoT devices deployed and operating in communication with an operator's network is expected to increase dramatically over the next several years, thereby further compromising network resources. Connected cars, also known as smart cars, are one type of IoT device that is expected to increase as new vehicles are deployed with technology to enable communications with cellular networks. IoT devices typically exchange small amounts of data in terms of bytes, such as an IoT water meter that periodically (e.g., monthly) reports a measurement to the water company. Other devices, such as connected cars, may exchange larger amounts of data with more frequency, such as data associated with update files. Additionally, these devices may require more frequent updates, which may be delivered over-the-air ("OTA"). The delivery of update files and other files OTA will increase data flow dramatically in the network in a short time period and will induce a negative impact on wireless network performance.

SUMMARY

Concepts and technologies disclosed herein are directed to the optimization of OTA file distribution for connected cars based upon a heuristic scheduling algorithm. According to one aspect disclosed herein, a system can execute instructions of a heuristic scheduling algorithm to schedule distribution of OTA of a file to each connected car of a plurality of connected cars operating in communication with a radio access network ("RAN"). The heuristic scheduling algorithm can set a day value equal to zero. The heuristic scheduling algorithm can determine if a number of unscheduled connected cars of the plurality of connected cars is equal to zero. When the number of unscheduled connected cars of the plurality of connected cars is not equal to zero, the heuristic scheduling algorithm can set the day value equal to the day value incremented by one (e.g., from DAY 0 to DAY 1, from DAY 1 to DAY 2, and so on for a given scheduling time window, such as 30 days), can set a schedule time value equal to zero, and can set a list of connected car candidates equal to a list of unscheduled connected cars. The heuristic scheduling algorithm can then sort in ascending order, for the schedule time value, a plurality of cells of the RAN by a sum of a first set of connected cars connected to a cell of the plurality of cells and a second set of connected cars connected to all neighbor cells of the cell, thereby creating a sorted list of cells. The sorted list of cells can include a number of sorted cells of the plurality of cells. The heuristic scheduling algorithm can then select a first cell from the sorted list of cells. The heuristic scheduling algorithm can select a connected car of the plurality of connected cars connected to the first cell that is connected to a fewest number of cells of the plurality of cells during a time between the schedule time value to a sum of the schedule time value and a schedule unit value, and that has a longest connection duration with the first cell. The heuristic scheduling algorithm can delete all cells connected to the connected car and any neighbor cells during a time between the schedule time value to a sum of the schedule time value and a schedule unit value, thereby creating a set of deleted cells. The heuristic scheduling algorithm can remove all connected cars that are connected to the set of deleted cells during a time between the schedule time value to a sum of the schedule time value and a schedule unit value, from the list of connected car candidates. The heuristic scheduling algorithm can determine if the number of sorted cells in the sorted list of cells is equal to zero. When the number of sorted cells in the sorted list of cells is equal to zero, the heuristic scheduling algorithm can update the schedule time value to be equal to the sum of the schedule time value and the schedule unit value. The heuristic scheduling algorithm can determine if the schedule time value is equal to an end of the value. When the schedule time value is equal to the end of the day value, the heuristic scheduling algorithm can again determine if the number of unscheduled connected cars of the plurality of connected cars is equal to zero, and if so, end execution. When the heuristic scheduling algorithm determines that the number of unscheduled connected cars of the plurality of connected cars is equal to zero, the heuristic scheduling algorithm can end execution. When the heuristic scheduling algorithm determines that the number of sorted cells is not equal to zero, the heuristic scheduling algorithm can select a next cell from the sorted list of cells.

In some embodiments, the file to be distributed to each connected car of the plurality of connected cars operating in communication with RAN can be or can include document files, image files, audio files, video files, data files, any combination thereof, and/or the like. The file, in some embodiments, can be or can include software, firmware, or a combination of software and firmware. The file, in some embodiments, can be or can include an initial release of software. The file, in some embodiments, can be or can include an initial release of firmware. The file, in some embodiments, can be or can include an update to an initial release of software. The file, in some embodiments, can be or can include an update to an initial release of firmware. The file, in some embodiments, can be or can include an update to a previously updated version of software. The file, in some embodiments, can be or can include an update to a previously updated version of firmware. A software or firmware update can include one or more fixes for one or more specific problems, which may be critical or non-critical to performance of one or more functions of the software and/or firmware. Moreover, a software or firmware update can focus on non-security-related fixes, security-related fixes, or some combination thereof. As updates are released for particular software or firmware, the file(s) associated therewith can be updated to include all updates to date. In this manner, a device that has not been previously updated from an earlier version of software and/or firmware can receive a single update that is cumulative of all updates to date. Those skilled in the art will appreciate the applicability of the concepts and technologies disclosed herein to other update practices, and as such, the update practices described herein should not be construed as being limiting in any way.

In some embodiments, the heuristic scheduling algorithm is based, at least in part, upon a driving pattern for each connected car of the plurality of connected cars. In some embodiments, the heuristic scheduling algorithm is further based, at least in part, upon a network connection pattern for each connected car of the plurality of connected cars. The heuristic scheduling algorithm balances distribution over-the-air of the file to each connected car of the plurality of connected cars operating in communication with the RAN among the plurality of cells of the RAN so as to minimize a negative impact on resources of the RAN. In some embodiments, the heuristic scheduling algorithm can be used to simulate the negative impact on resources of the RAN. The heuristic scheduling algorithm can be modified to further reduce the negative impact on the resources of the RAN.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
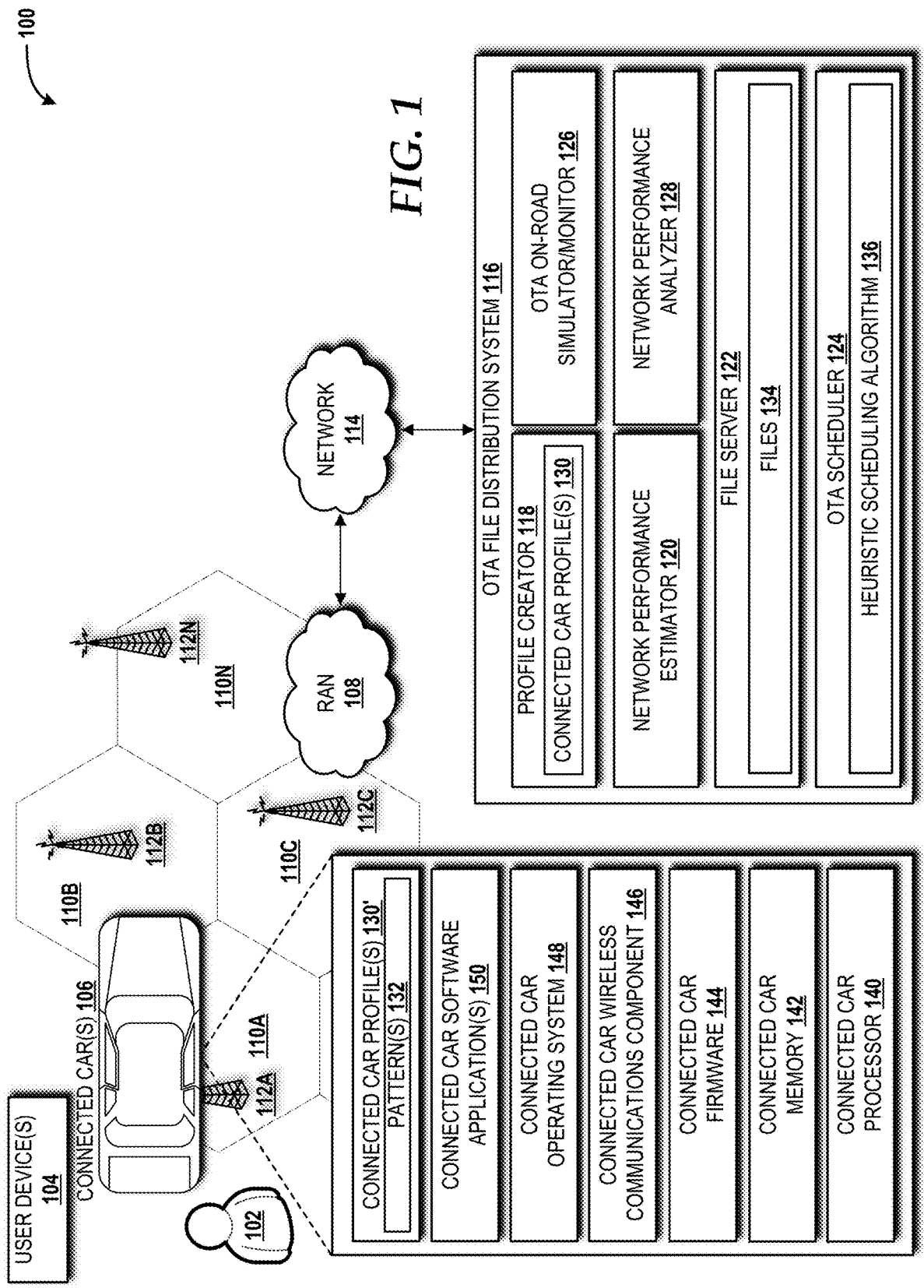
FIG. 1 is a block diagram illustrating aspects of an illustrative operating environment for various concepts disclosed herein.

Concepts and technologies disclosed herein are directed to the optimization of OTA file distribution for connected cars based upon a heuristic scheduling algorithm. Although the concepts and technologies disclosed herein find particular application to connected cars, the concepts and technologies disclosed herein can be applied to any device that can use OTA file pushes to download files such as firmware, security updates, video, audio, and/or other files OTA. As such, the connected car examples disclosed herein should not be construed as being limiting in any way.

It is likely that, once deployed, connected cars will be required to download files with large file sizes (e.g., greater than 100 megabytes), such as a firmware and/or software update, through the operator's network multiple times per year. In a short time window, such as 30 days, millions of connected cars likely will download the target file while driving on the road. When a connected car downloads OTA, the connected car will compete with other devices for network capacity; more specifically, the connected car will compete for network capacity with other mobile devices in a given cell served by a radio base station. This will increase the cell traffic loading per cell and decrease the throughput per user. Meanwhile, higher traffic loading at the cell will incur stronger interference with other neighboring cells. As a result, a connected car downloading at the cell will negatively affect the signal-to-interference-plus-noise ratio ("SINR") of the neighbor cells, and therefore, will decrease the cell capacity and throughput available from the neighbor cells. Since OTA file size (e.g., 100 MB or more) is typically larger compared to average mobile user traffic during busy hours (e.g., 10 MB or less), OTA's impact on the network is more significant due to the long download time required to fully download an OTA file. This presents a challenge to operators due to the limited bandwidth and OTA-affected interference, which, in turn, can lead to degradation of throughput available to other mobile users, especially during peak hours.

In an effort to meet the aforementioned challenge, the concepts and technologies disclosed herein provide a schedule for file updates. This schedule is designed to optimally distribute OTA data flow to connected cars over the network (geographically) and over a scheduling time horizon (timely), and is capable of reducing the negative impact of OTA file updates on overall wireless network performance. This schedule was created based upon historical statistics associated with connected car driving patterns and simulations of connected car-specific OTA traffic over the network. By leveraging connected cars that connect to different cells at different times based upon driving patterns, an effective scheduling algorithm was developed to reduce OTA impact on the network.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, vehicles, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of optimization of over-the-air file distribution for connected cars based upon a heuristic scheduling algorithm will be described.

Referring now to FIG. 1, aspects of an illustrative operating environment 100 for various concepts disclosed herein will be described. It should be understood that the operating environment 100 and the various components thereof have been greatly simplified for purposes of discussion. Accordingly, additional or alternative components of the operating environment 100 can be made available without departing from the embodiments described herein.

The operating environment 100 shown in FIG. 1 includes a user 102 who is associated with a user device 104 and a connected car 106. The user device 104 and the connected car 106 are both configured to connect to and communicate with one or more radio access networks ("RANs") 108 over an air/radio interface. The illustrated RAN 108 includes a plurality of cells 110A-110N, each of which is served by one or more base stations 112A-112N. As used herein, a "cell" refers to a geographical area that is served by one or more base stations operating within a RAN, such as the RAN 108. As used herein, a "base station" refers to a radio receiver and/or transmitter (collectively, transceiver) that is/are configured to provide a radio/air interface by which devices, such as the user device 104 and the connected car 106, can connect to one or more networks 114. Accordingly, a base station is intended to encompass one or more base transceiver stations ("BTSs"), one or more NodeBs, one or more eNodeBs, and/or other networking nodes that are capable of providing a radio/air interface regardless of the technologies utilized to do so. A base station can be in communication with one or more antennas (not shown), each of which may be configured in accordance with any antenna design specifications to provide a physical interface for receiving and transmitting radio waves.

According to various embodiments, the functionality of the user device 104 may be provided by one or more mobile telephones, smartphones, tablet computers, slate computers, smart watches, fitness devices, smart glasses (e.g., the GOOGLE GLASS family of products), other wearable devices, mobile media playback devices, set top devices, navigation devices, laptop computers, notebook computers, ultrabook computers, netbook computers, server computers, computers of other form factors, computing devices of other form factors, other computing systems, other computing devices, and/or the like. It should be understood that the functionality of the user device 104 can be provided by a single device, by two or more similar devices, and/or by two or more dissimilar devices.

The connected car 106 can be a car, truck, van, motorcycle, moped, go-kart, golf cart, or any other ground-based vehicle configured to transport one or more passengers and/or cargo. The connected car 106 can be driven by the user 102 and/or another person. The connected car 106, in some embodiments, is capable of operating in at least a partially autonomous control mode. The connected car 106, in some embodiments, is a fully autonomous vehicle. In some embodiments, the user vehicle 106 can operate as a level 3 or level 4 vehicle as defined by the National Highway Traffic Safety Administration ("NHTSA"). The NHTSA defines a level 3 vehicle as a limited self-driving automation vehicle that enables a driver to cede full control of all safety-critical functions under certain traffic or environmental conditions, and in those conditions to rely heavily on the vehicle to monitor for changes that require transition back to driver control. In a level 3 vehicle, the driver is expected to be available for occasional control, but with sufficiently comfortable transition time. The GOOGLE car, available from GOOGLE, is an example of a limited self-driving automation vehicle. The NHTSA defines a level 4 vehicle as a full self-driving automation vehicle that is designed to perform all safety-critical driving functions and monitor roadway conditions for an entire trip to a destination. Such a design anticipates that a user will provide destination or navigation input, but is not expected to be available for control at any time during the trip. This includes both occupied and unoccupied vehicles.

Moreover, the user device 104 can be independent of the connected car 106 or integrated with the connected car 106. In some embodiments, the user device 104 is configured to communicate with the connected car 106 via a wired connection such as universal serial bus ("USB") or via a wireless connection such as BLUETOOTH. In some other embodiments, the user device 104 is integrated within the connected car 106 such as part of a vehicle entertainment system (not shown; also commonly referred to as "infotainment"), a vehicle navigation system, a vehicle engine control unit ("ECU"), and/or another computing system of the connected car 106. The user device 104, in some embodiments, can communicate with the connected car 106 via a controller area network ("CAN") bus. The user device 104 may be retrofitted into the connected car 106 as aftermarket equipment or may be made available as standard or optional original equipment manufacturer ("OEM") equipment of the connected car 106.

The network 114 can be or can include one or more wireless wide area networks ("WWANs"), which may, in turn, include one or more core networks such as a circuit-switched core network ("CS CN"), a packet-switched core network ("PS CN"), an IP multimedia subsystem ("IMS") core network, multiples thereof, and/or combinations thereof. The WWAN can utilize one or more mobile telecommunications technologies, such as, but not limited to, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other 802.XX technologies (e.g., 802.11 WI-FI), and the like. The RAN 108 can utilize various channel access methods (which might or might not be used by the aforementioned standards) including, but not limited to, Time Division Multiple Access ("TDMA"), Frequency Division Multiple Access ("FDMA"), Single Carrier FDMA ("SC-FDMA"), CDMA, wideband CDMA ("W-CDMA"), Orthogonal Frequency Division Multiplexing ("OFDM"), Space Division Multiple Access ("SDMA"), and/or the like to provide a radio/air interface to the user device 104 and the connected car 106. Data communications can be provided in part by a RAN using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, a RAN may be a GSM RAN ("GRAN"), a GSM EDGE RAN ("GERAN"), a UMTS Terrestrial Radio Access Network ("UTRAN"), an E-UTRAN, any combination thereof, and/or the like.

The RAN 108 can provide the user device 104 and the connected car 106 access to the network 114 over which to communicate with an OTA file distribution system 116. The OTA file distribution system 116 is utilized to implement aspects of the concepts and technologies described herein. The illustrated OTA file distribution system 116 encompasses several components, each of which may be combined into a single system as shown, or may be implemented as separate components capable of communicating together to share information. The OTA file distribution system 116 can include any hardware, software, firmware, or some combination thereof in any configuration to implement aspects of the concept and technologies disclosed herein. For example, the OTA distribution system 116, or one or more components thereof, can be implemented, at least in part, on a computer system, such as on an example computer system 500 shown in FIG. 5. Alternatively, the OTA distribution system 116, or one or more components thereof, can be implemented, at least in part, on an example system virtualization platform 700 shown in FIG. 7.

The illustrated OTA file distribution system 116 includes a profile creator 118, a network performance estimator 120, a file server 122, an OTA scheduler 124, an OTA on-road simulator/monitor 126, and a network performance analyzer 128. As noted above, in some embodiments, these components can be implemented by a single system or by multiple systems, on physical or virtualized hardware resources. In some embodiments, the components above are implemented as one or more software modules, each including instructions that, when executed by one or more processors of the OTA file distribution system 116, causes the processor(s) to perform operations described herein.

The profile creator 118 can create one or more connected car profiles 130 associated with one or more connected cars 106. A connected car profile 130 can include driving data. The driving data can include the connected cells of a connected car reported by cell detail records. The driving data can include data associated with where (geographically) a connected car 106 has been driven by the user 102 and/or autonomously. The driving data can include, for each driving instance, a date, a start time, an end time, and/or a duration of the driving instance. The driving data can include any other data associated with one or more driving instances associated with a connected car 106. For example, the driving data can include data obtained from one or more sensors (not shown) of the connected car 106. The driving data obtained from sensors can include throttle input data, brake input data, steering input data, and/or any other data associated with how the connected car 106 is driven. The driving data can be collected and superfluous driving data can be deleted over time and the connected car profile(s) 130 updated accordingly.

Besides the direct reported car connected cell records, the profile creator 118 can utilize the driving data to create one or more patterns 132 (illustrated as part of the connected car profile(s) 130' stored in the connected car 106). The patterns 132 can be indicative of how the connected car 106 is driven over time. A connected car profile 130 can additionally include connection data associated with connections between the connected car 106 and the RAN 108, and more particularly, to which of the base station(s) 112 the connected car 106 was connected to and the corresponding cell(s) 110, which can be identified by cell ID, for example. Other connection data can include type of connection (e.g., voice connection, data connection, or combined voice/data connection), connection duration, connection data download speed, connection data upload speed, and/or any other quantitative data that can be obtained for a given connection. The connection data also can be utilized to create one or more of the patterns 132 either specifically connection-related patterns or a combination pattern that incorporates both driving and connection data. The profile creator 118 can derive the patterns 132 for each connected car 106 in weekday/weekend based on the historical network connection session data, and use that pattern to predict when and where the connected car 106 can be scheduled for an OTA file download.

The network performance estimator 120 can estimate performance of at least a portion of one or more networks, such as the RAN 108 and/or the network 114. In some embodiments, the network performance estimator 120 can estimate performance of one or more of the cells 110 of the RAN 108 based upon the historic performance thereof with respect to one or more performance metrics. The performance metrics can include, but are not limited to, downlink throughput, uplink throughput, SINR, and the like. Data associated with one or more performance metrics can be obtained by the network performance analyzer 128 over time and added to a collection of performance data from which the network performance estimator 120 can derive network performance estimates based upon historic performance.

The file server 122 can store files 134 for distribution to the user device(s) 104, the connected car(s) 106, and/or one or more other devices (not shown). The files 134 can be of any file type. The concepts and technologies disclosed herein will be described with respect to an implementation in which the files 134 can be pushed OTA to one or more devices, such as the user device 104 and/or the connected car(s) 106. The files 134 can include document files, image files, audio files, video files, data files, any combination thereof, and/or the like. The files 134 can include software, firmware, or a combination of software and firmware. The files 134 can include an initial release of software, an initial release of firmware, an update to an initial release of software, an update to an initial release of firmware, an update to a previously updated version of software, and/or an update to a previously updated version of firmware. A software or firmware update can include one or more fixes for one or more specific problems, which may be critical or non-critical to performance of one or more functions of the software and/or firmware. Moreover, a software or firmware update can focus on non-security-related fixes, security-related fixes, or some combination thereof. As updates are released for particular software or firmware, the file(s) 134 associated therewith can be updated to include all updates to date. In this manner, a device that has not been previously updated from an earlier version of software and/or firmware can receive a single update that is cumulative of all updates to date. Those skilled in the art will appreciate the applicability of the concepts and technologies disclosed herein to other update practices, and as such, the update practices described herein should not be construed as being limiting in any way.

The OTA scheduler 124 schedules OTA distribution of the files 134 to the user device(s) 104, the connected car(s) 106, and/or other devices based upon execution of a heuristic scheduling algorithm 136 to reduce the impact of OTA updates on the usage of network resources of an operator's network, such as the RAN 108 and/or the network 114.

The heuristic scheduling algorithm 136 can be designed to meet specific requirements and to address the challenges of OTA file distribution as noted herein. In one example implementation of the heuristic scheduling algorithm 136 that is particular to the distribution of the files 134 OTA to the connected cars 106, the heuristic scheduling algorithm 136 can consider a schedule time ("ST") requirement. The ST requirement can specify that all or a certain percentage of the connected cars 106 are to be scheduled for an OTA update (e.g., that includes one or more of the files 134) within a defined time window (e.g., 30 days) when a new update (e.g., firmware, software, security update) is released. Moreover, the ST requirement can specify that each of the connected cars 106 is to complete the download within a specified number of ignition cycles (or start cycles for electric-powered connected cars) once the download is started. For example, the ST requirement can specify that each of the connected cars 106 completes the download within four ignition cycles and within two days. The ST requirement can be specified by a network operator, an OEM of the connected car 106, the user 102, or any other entity associated in any way with the file(s) 134 to be distributed.

The heuristic scheduling algorithm 136 also can be designed to consider an OTA download requirement. For example, a customer, such as the user 102, may be required to provide consent prior to his or her device, such as the connected car 106, starting an OTA download. The customer can provide such consent, for example, in response to a notification sent to his or her device. This notification can be, in some implementations, part of scheduling that notifies the user 102 of a time frame during which the OTA download will be attempted, reattempted, or continued in accordance with the ST requirement. The OTA download requirement also can specify that the engine, motor, hybrid propulsion system (e.g., gasoline engine and electric motor), or any other propulsion system utilized by the connected car 106 to be in an "ON" operational state prior to connecting to the RAN 108 and starting the OTA download. The OTA download requirement can specify that downloading stops when the connected car 106 is put in an "OFF" operational state and resumed the next time the connected car 106 is put in an "ON" operational states. This requirement can be coupled with the ST requirement described above such that the OTA download must be completed within a specified number of ignition (e.g., ON/OFF) cycles. Moreover, in some implementations, the OTA download requirement might require the connected car 106 to download over a cellular connection, even if other wireless connectivity, such as via WI-FI, is available and the connected car 106 has the hardware necessary to support such alternative connections. This requirement may be established per an agreement, for example, between an OEM of the connected car 106 and an operator that provides, at least in part, the RAN 108.

The heuristic scheduling algorithm 136 also can be designed in consideration of minimizing the impact on the RAN 108 and/or the network 114. In particular, the heuristic scheduling algorithm 136 can minimize the number of connected cars 106 that are permitted to connect to the same cell for OTA download simultaneously to prevent a decrease in throughput. The heuristic scheduling algorithm 136 can minimize the number of neighboring cells supporting OTA downloads to mitigate (or prevent in some instances) interference.

The heuristic scheduling algorithm 136 also can be designed in consideration of large scale deployment of devices, such as the connected cars 106, in a given market. For example, it is expected that millions of connected cars will be on the road in the United States in 2017 and the expectation is this number will increase every year thereafter as older cars are replaced with cars that have connected car capability. As such, it is possible that hundreds if not thousands of connected cars can be scheduled for OTA download for each 24-hour time period in a given schedule time window.

The heuristic scheduling algorithm 136 is able to cure several deficiencies in prior art scheduling schemes, some of which will now be described. A batch-size scheduling scheme that employs random selection can be used to schedule OTA file distribution of the files 134. A batch-size scheduling scheme that employs random selection divides the total amount of connected cars into "N" batches evenly and randomly. At a specified time (such as midnight), an OTA update notification is pushed to each connected car in the current batch per day so that users can start downloading the OTA update once the car is put into an "ON" operational state and the users provide their consent. A batch-size scheduling scheme that employs random selection is simple to apply, however, OTA downloads will centralize during a busy time. For example, users who drive their connected cars 106 on the same highway in the morning to their workplaces and would start OTA downloads simultaneously. Without any driving pattern specified scheduling, this scheduling scheme has no control over the number of OTA users in a given cell and the number of OTA users in that cell's neighboring cell(s). Moreover, when a cell has one or more OTA users, the throughput provided by that cell will be downgraded for other users connected on the same cell (i.e., bandwidth sharing), and meanwhile this cell's physical resource block ("PRB") traffic loading will be increased significantly and lead to poor SINR for its neighbor cell(s). Consequently, the neighbor cell(s) also will be downgraded. In summary, a batch-size scheduling scheme that employs random selection will reduce overall network performance as the number of simultaneous OTA downloads increases.

An individual scheduling scheme that employs mixed integer programming ("MIP") also can be used to schedule OTA file distribution of the files 134. MIP models have been built and tested to minimize the number of OTA users connected to the same cell and its neighbor cell(s) in a basic time unit. Due to the large scale of OTA update distribution, optimization using this scheduling scheme is best solved in two stages that sacrifices some optimality. In particular, a first stage schedules all connected cars at different days by each connected car's daily cell connection pattern, and a second stage focuses on each day and optimizes the schedule time for each connected car scheduled on that day based upon that connected car's cell connection in a basic time unit. The basic time unit can be set to hourly so MIP could be solved in reasonable amount of time.

The heuristic scheduling algorithm 136 takes advantage of several optimization opportunities to schedule OTA file distribution. The heuristic scheduling algorithm 136 can take advantage of a local optimization opportunity to minimize throughput impact by limiting the number of OTA users on the same cell. Once a device (e.g., the connected car 106) is scheduled to receive, at least in part, one or more of the files 134 OTA, other devices will not be scheduled to this cell in the same schedule unit (i.e., time period). In this manner, the throughput of a cell can be maintained as high as possible for OTA file distribution to that cell. Another local optimization opportunity to minimize throughput impact is by limiting the number of OTA users on neighbor cells. Once a device (e.g., the connected car 106) is scheduled to receive, at least in part, one or more files 134 OTA, other devices will not be scheduled to any neighboring cell. In this manner, interference between the neighboring cell(s) and the serving cell will be minimized or eliminated altogether.

The heuristic scheduling algorithm 136 also can take advantage of a global optimization opportunity to minimize bandwidth impact by smoothing OTA file distribution over a network (e.g., the RAN 108). Bandwidth usage can be further reduced by smoothing OTA file distribution over a scheduling time horizon.

Operators, software developers, firmware developers, and/or other entities may provide a window in which a set of one or more devices is to be updated. For example, an operator may release a new firmware update that is used to implement a new feature on devices served by the operator's network, and the operator might require that the new firmware update be distributed to the devices within a time window, such as 30 days. In an effort to meet this requirement, the heuristic scheduling algorithm 136 can implement a rule to utilize a prioritization scheme to assign a higher priority to schedule devices that connect to one or more of the cells having fewer device connections. The heuristic scheduling algorithm 136 can implement another rule to utilize a prioritization scheme to assign a higher priority to schedule a device to select a cell if this device connects to fewer other cells in given time window and the device has the longest connection time to that cell. An example implementation of the heuristic scheduling algorithm 136 is described in greater detail herein below with reference to FIG. 4.

The OTA file distribution system 116 can use the OTA on-road simulator/monitor 126 to simulate real-world performance of the heuristic scheduling algorithm 136 prior to "going live" and can monitor real-world performance of the heuristic scheduling algorithm 136 after "going live." An example simulation that could be conducted by the OTA on-road simulator/monitor 126 based upon a simulation of the heuristic scheduling algorithm 136 will now be described.

In this example simulation, five simulation cases (CASE 0-CASE 4) will be referenced. For CASE 0 (the baseline CASE for this example simulation), a batch-size selection scheduling scheme with random selection is used. For CASE 1, heuristic individual scheduling is used based upon execution of the heuristic scheduling algorithm 136 with a scheduling unit set equal to 1 hour. For CASE 2, a heuristic individual scheduling scheme is used based upon execution of the heuristic scheduling algorithm 136 with a scheduling unit set equal to 3 hours. For CASE 3, an individual scheduling scheme with a first MIP model is used. For CASE 4, an individual scheduling with a second MIP model is used. Comparison measurements of this example simulation utilize a time unit set equal to 10 minutes and measured throughput is updated at each time unit (i.e., every 10 minutes).

The example simulation measures network impact based upon the number of international mobile subscriber identities ("IMSIs") per cell, active cell, active neighbor ("NBR") cells, and cell load (in MB). IMSI per cell specifies the number of active IMSIs in a given cell during one time unit. Active cell specifies the number of active cells during one time unit. The active NBR specifies the number of active neighbor cells of a cell during one time unit. The cell load specifies the OTA traffic of every cell during one time unit. This example simulation also provides OTA download-related measurements, including average download duration (in seconds), average effective duration (in seconds), and download completion ratio in two days. The download duration is equal to download end minus download start. The effective download duration is equal to download time connecting to the network 114 via the RAN 108.

Figure 2:
FIG. 2 is a table illustrating example simulation results of a simulation that utilizes a heuristic scheduling algorithm disclosed herein.

Turning briefly to FIG. 2, a table 200 illustrating example simulation results of the aforementioned simulation based upon a forecasted number of connected cars expected to be operational in a portion of Texas, United States in the year 2017 will be described. The simulation results are based upon a file size of 500 MB and a schedule time window of 30 days. The illustrated table 200 identifies three rows for each of the aforementioned simulation CASES—that is, three rows associated with CASE 1 202A, CASE 2 202B, CASE 3 202C, CASE 4 202D, and CASE 0 202E. Each of these rows shows an average, median, or maximum value for columns associated with an IMSI per cell 204, an active NBR 206, an active cell 208, a cell load (in MB) 210, an average download duration (in seconds) 212, an average effective duration (in seconds) 214, and a completion ratio (set to 2 days) 216.

The illustrated table 200 shows that even though CASE 0 has the best values for OTA download measurements, CASE 1 and CASE 0 are tied in terms of average effective duration 214 and completion ratios 216. Moreover, CASE 0 has a better average download duration 212 since each connected car could download OTA through its full day driving time while an individual scheduled connected car may start download later in the afternoon and so with a longer duration. CASE 1 has better values for IMSI per cell 204, active NBR 206, and an active cell 208 than CASE 0. This indicates that the heuristic scheduling algorithm 136 reduces the network impact from the connected car 106 in terms of resources occupied and interference.

Figure 3:
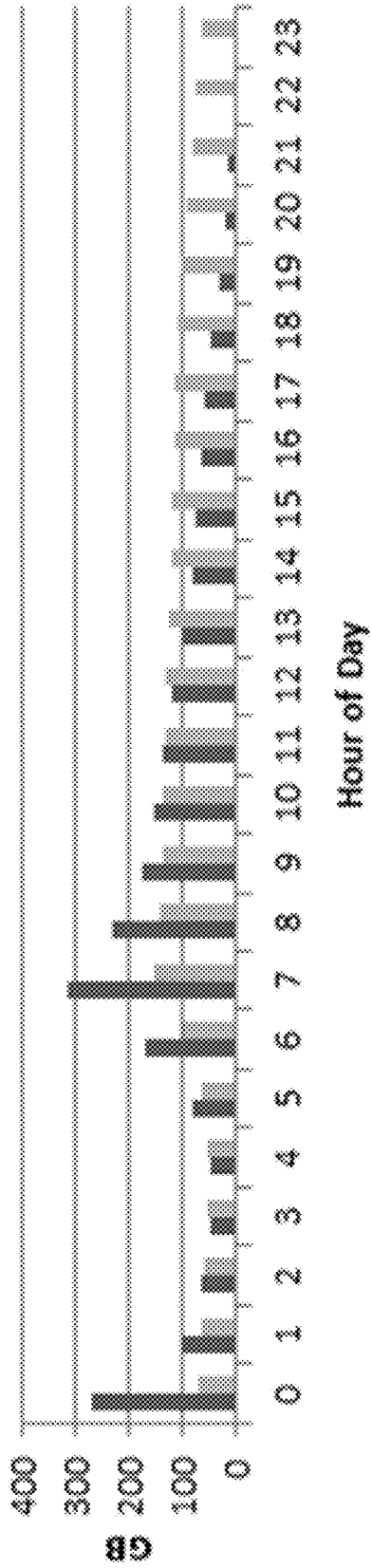
FIG. 3 is a graph illustrating an OTA hourly traffic comparison between two top performing simulation cases of a simulation that utilizes a heuristic scheduling algorithm disclosed herein.

Turning now briefly to FIG. 3, a graph 300 illustrating an OTA hourly traffic comparison between CASE 0 and CASE 1 will be described. As shown in the graph 300, CASE 1 smoothens the hourly OTA flow compared to the centralized flow of CASE 0. At the peak hour (hour 7), the OTA size of CASE 1 is nearly half of CASE 0. Thus, it can be seen that the heuristic scheduling algorithm 136 as demonstrated by the results of CASE 1 effectively smoothens the OTA impact on the RAN 108 during busy hours.

Returning to FIG. 1, the illustrated connected car 106 includes a connected car processor 140, a connected car memory 142, a connected car firmware 144, a connected car wireless communications component 146, a connected car operation system 148, and a connected car software application 150. Each of these components will now be described in detail.

The connected car processor 140 can include one or more hardware components that perform computations to process data, and/or to execute computer-executable instructions of one or more application programs such as the connected car software application(s) 150, one or more operating systems such as the connected car operating system 148, other software, and/or the connected car firmware 144. The connected car processor 140 can include one or more central processing units ("CPUs") configured with one or more processing cores. The connected car processor 140 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the connected car processor 140 can include one or more discrete GPUs. In some other embodiments, the connected car processor 140 can include CPU and GPU components that are configured in accordance with a co-processing CPU/GPU computing model, wherein the sequential part of an application executes on the CPU and the computationally-intensive part is accelerated by the GPU. The connected car processor 140 can include one or more system-on-chip ("SoC") components along with one or more other components illustrated as being part of the connected car 106, including, for example, the connected car memory 142. In some embodiments, the connected car processor 140 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The connected car processor 140 can be or can include one or more hardware components architected in accordance with an ARM architecture, available for license from ARM HOLDINGS of Cambridge, United Kingdom. Alternatively, the connected car processor 140 can be or can include one or more hardware components architected in accordance with an x86 architecture, such an architecture available from INTEL CORPORATION of Mountain View, Calif., and others. Those skilled in the art will appreciate the implementation of the connected car processor 140 can utilize various computation architectures, and as such, the connected car processor 140 should not be construed as being limited to any particular computation architecture or combination of computation architectures, including those explicitly disclosed herein.

The connected car memory 142 can include one or more hardware components that perform storage operations, including temporary or permanent storage operations. In some embodiments, the connected car memory 142 includes volatile and/or non-volatile memory implemented in any method or technology for storage of information such as computer-readable instructions, data structures, program modules, the connected car operating system 148, the connected car firmware 144, the connected car software application(s) 150, and/or other software, firmware, and/or other data (e.g., the connected car profiles 130' and the patterns 132) disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the connected car processor 140.

The connected car firmware 144, also known as microcode, can be written onto a ROM of the connected car memory 142 of the connected car device 106. The connected car firmware 144 can be written on the ROM at the time of manufacturing and is used to execute programs on the connected car device 106. In some embodiments, the connected car firmware 144 includes the connected car operating system 148. In some embodiments, the connected car firmware 144 is the connected car operating system 148. In some embodiments, the connected car firmware 144 and the connected car operating system 148 are closely integrated for performance of operations of the connected car device 106. As explained above, the connected car firmware 144 can be updated OTA by the OTA distribution system 116 using one or more of the files 134.

The connected car wireless communications component 146 can include one or more wireless wide area network ("WWAN") components capable of facilitating communication with one or more WWANs, such as the network 114 via the RAN 108. In some embodiments, the connected car wireless communications component 146 is configured to provide multi-mode connectivity. For example, the connected car wireless communications component 146 may be configured to provide connectivity to the RAN 108, wherein the RAN 108 functions in accordance with UMTS and LTE technologies, or via some other combination of technologies. Alternatively, multiple connected car wireless communications components 146 may be utilized to perform such functionality, and/or provide additional functionality to support other non-compatible technologies (i.e., incapable of being supported by a single WWAN component).

The connected car operating system 148 can control the operation of at least a portion of the connected car 106. In some embodiments, the connected car operating system 148 includes the functionality of the connected car firmware 144 and/or the connected car software application(s) 150. The connected car operating system 148 can be executed by the connected car processor 140 to cause the connected car 106 to perform various operations. The connected car operating system 148 can include a member of the SYMBIAN OS family of operating systems from SYMBIAN LIMITED, a member of the WINDOWS OS, WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems or a member of the OS X family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The connected car software application(s) 150 can execute on top of the connected car operating system 148. The connected car software application(s) 150 can be executed by the connected device processor 140 to cause the connected car 106 to perform various operations described herein. For example, the connected car software application(s) 150 can be part of a vehicle entertainment system, a vehicle navigation system, a vehicle ECU, and/or another computing system of the user vehicle.

It should be understood that some implementations of the operating environment 100 include one or more users 102, one or more user devices 104, one or more connected cars 106, one or more RANs 108, one or more cells 110, one or more base stations 112, one or more networks 114, one or more OTA file distribution systems 116, one or more profile creators 118, one or more network performance estimator 120, one or more file servers 122, one or more OTA schedulers 124, one or more OTA on-road simulators/monitors 126, one or more connected car profiles 130, one or more patterns 132, one or more files 134, one or more heuristic scheduling algorithm 136, one or more connected car processors 140, one or more connected car memory 142, one or more connected car firmware 144, one or more connected car wireless communications components 146, one or more connected car operating systems 148, one or more connected car software applications 150, or any combinations thereof. Thus, the illustrated embodiment should be understood as being illustrative, and should not be construed as being limiting in any way.

Figure 4:
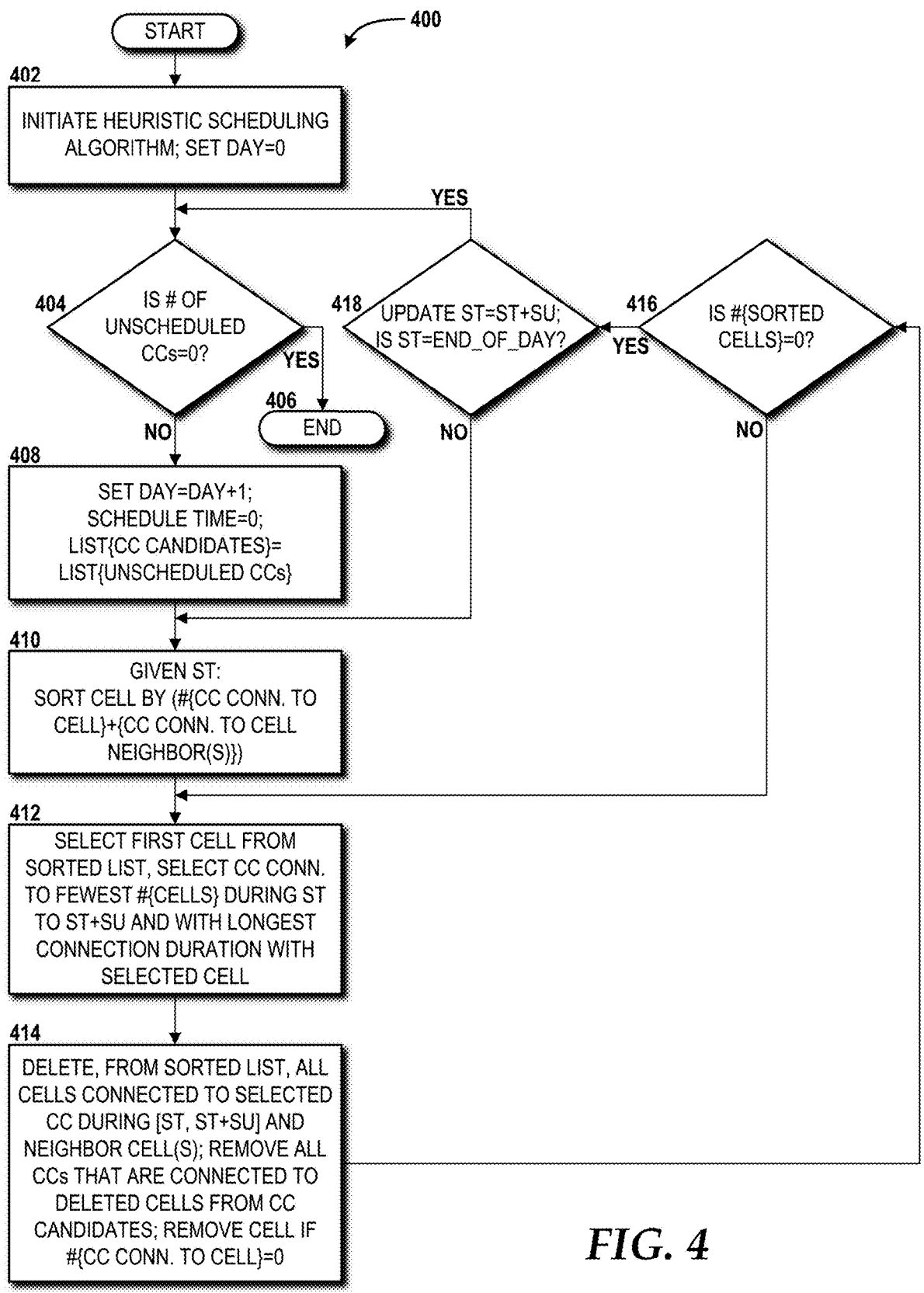
FIG. 4 is a flow diagram illustrating aspects of a method for implementing a heuristic scheduling algorithm, according to an illustrative embodiment of the concepts and technologies disclosed herein.

Turning now to FIG. 4, a flow diagram illustrating aspects of a method 400 for implementing the heuristic scheduling algorithm 136 will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems or devices, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors of one or more computing systems and/or devices disclosed herein to perform operations.

For purposes of illustrating and describing some of the concepts of the present disclosure, the method 400 is described as being performed, at least in part, by the OTA file distribution system 116, and more particularly, the OTA scheduler 124 via execution of one or more software modules to implement the heuristic scheduling algorithm 136. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 400 will be described with reference to FIG. 4 and further reference to FIG. 1. The method 400 begins and proceeds to operation 402, where the OTA scheduler 124 initiates the heuristic scheduling algorithm 136 and sets the day equal to 0 (i.e., DAY=0). From operation 402, the method 400 proceeds to operation 404, where the OTA scheduler 124 determines if the number of unscheduled connected cars is equal to 0 (i.e., # of unscheduled CCs=0). The number of unscheduled connected cars can be determined based upon the number of connected cars on the road that need a file. In some implementations, the number of unscheduled connected cars is provided by the OEM, which can maintain a record of the software and/or firmware versions installed on each connected car identified via vehicle identification number ("VIN"). If the OTA scheduler 124 determines that the number of unscheduled connected cars is equal to 0, then the method 400 proceeds to operation 406, where the method 400 ends. If, however, the OTA scheduler 124 determines that the number of unscheduled connected cars is not equal to 0 (i.e., one or more unscheduled connected cars exist), then the method 400 proceeds to operation 408, where the OTA scheduler 124 sets the day equal to DAY+1 (i.e., DAY=DAY+1); the OTA scheduler 124 sets schedule time equal to 0 (i.e., SCHEDULE TIME=0); and the OTA scheduler 124 sets a list of connected car candidates equal to a list of unscheduled connected cars (i.e., LIST {CC CANDIDATES}=LIST {UNSCHEDULED CCs}).

From operation 408, the method 400 proceeds to operation 410, where the OTA scheduler 124, for a given schedule time ("ST"), sorts cells, in ascending order, by the sum of the number of connected cars connected to a given cell and the number of connected cars connected to one or more neighbor cells to create a sorted list. From operation 410, the method 400 proceeds to operation 412, where the OTA scheduler 124 selects a first cell from the sorted list. Also at operation 412, the OTA scheduler 124 selects the connected car that is connected to the fewest number of cells during a time between the schedule time to the sum of the schedule time and a schedule unit (constant) and with the longest connection duration with the selected cell. The OTA scheduler 124 can utilize information from the cell connection history as reported by the RAN 108.

From operation 412, the method 400 proceeds to operation 414, where the OTA scheduler 124 deletes, from the sorted list, all cells connected to the selected connected car (selected at operation 412) during the time between the schedule time to the sum of the schedule time and the constant schedule unit and any neighbor cell(s). The OTA scheduler 124, at operation 414, also removes all connected cars that are connected to the deleted cell(s) from the list of connected car candidates. The OTA scheduler 124 also removes all cells that have no connections to a connected car 106.

From operation 414, the method 400 proceeds to operation 416, where the OTA scheduler 124 determines if the number of remaining sorted cells is equal to zero. If the OTA scheduler 124 determines that the number of remaining sorted cells is not equal to zero, then the method 400 returns to operation 412, and the method 400 proceeds as described above at operation 412. If, however, at operation 416, the OTA scheduler 124 determines that the number of remaining sorted cells is equal to zero, then the method 400 proceeds to operation 418. The OTA scheduler 124, at operation 418, updates the schedule time to be equal to the sum of the schedule time and the schedule unit (constant). The OTA scheduler 124 also determines if the schedule time is equal to the end of day. If the OTA scheduler 124 determines that the schedule time is equal to the end of day, then the method 400 returns to operation 404, and the method 400 proceeds as described above at operation 404. If, however, the OTA scheduler 124 determines that the schedule time is not equal to the end of day, then the method 400 returns to operation 410, and the method 400 proceeds as described at operation 410.

The method 400 can be implemented as computer-executable instructions that, when executed by a processor, cause the processor to perform the aforementioned operations. The method 400 will now be described in summary as pseudo-code from which such computer-executable instructions can be created. This pseudo-code is provided merely to aid in understanding of the concepts and technologies disclosed herein, and as such, should not be construed as being limiting in any way.

Initialization: Day=0
WHILE (at least one connected car is unscheduled for OTA file download)
  SET Day=Day+1. Copy unscheduled connected car list to connected car candidate list of the day.
  For each day, initiate schedule time ("ST") loop with constant schedule unit ("SU") (e.g., 0, SU, 2XSU, . . . )
    Step 1: During time duration from ST to ST+SU, calculate the number of connected cars in the candidate list connected to each cell and to its neighbor cell(s), and sort the cells by the number calculated in ascending order to create a sorted list of cells.
    Step 2: Select the first cell from the sorted list of cells. Among the connected cars in the candidates list of the selected cell, schedule the connected car that is connecting to the fewest number of cells in [ST, ST+SU) and with the longest connection duration with the selected cell.
    Step 3: Once a connected car is scheduled for the OTA file download, remove all cells to which this connected car is connected to in [ST, ST+SU) and any corresponding neighbor cell(s) from the sorted list of cells, and remove all connected cars connecting to those deleted cells from the connected car candidates list for this ST. If a cell no longer has connected car candidates, remove the cell from the sorted list of cells. Repeat step 2 until no cell left for this ST.
  End of schedule time loop.
  For all connected cars scheduled in this ST, remove from unscheduled connected car list.
End of WHILE Loop
For connected cars scheduled after the required time window (e.g., 30 days) if any, re-schedule connected cars to the same schedule unit of a day within the time window and has the same day of week (e.g., to maintain the same driving pattern).

Figure 5:
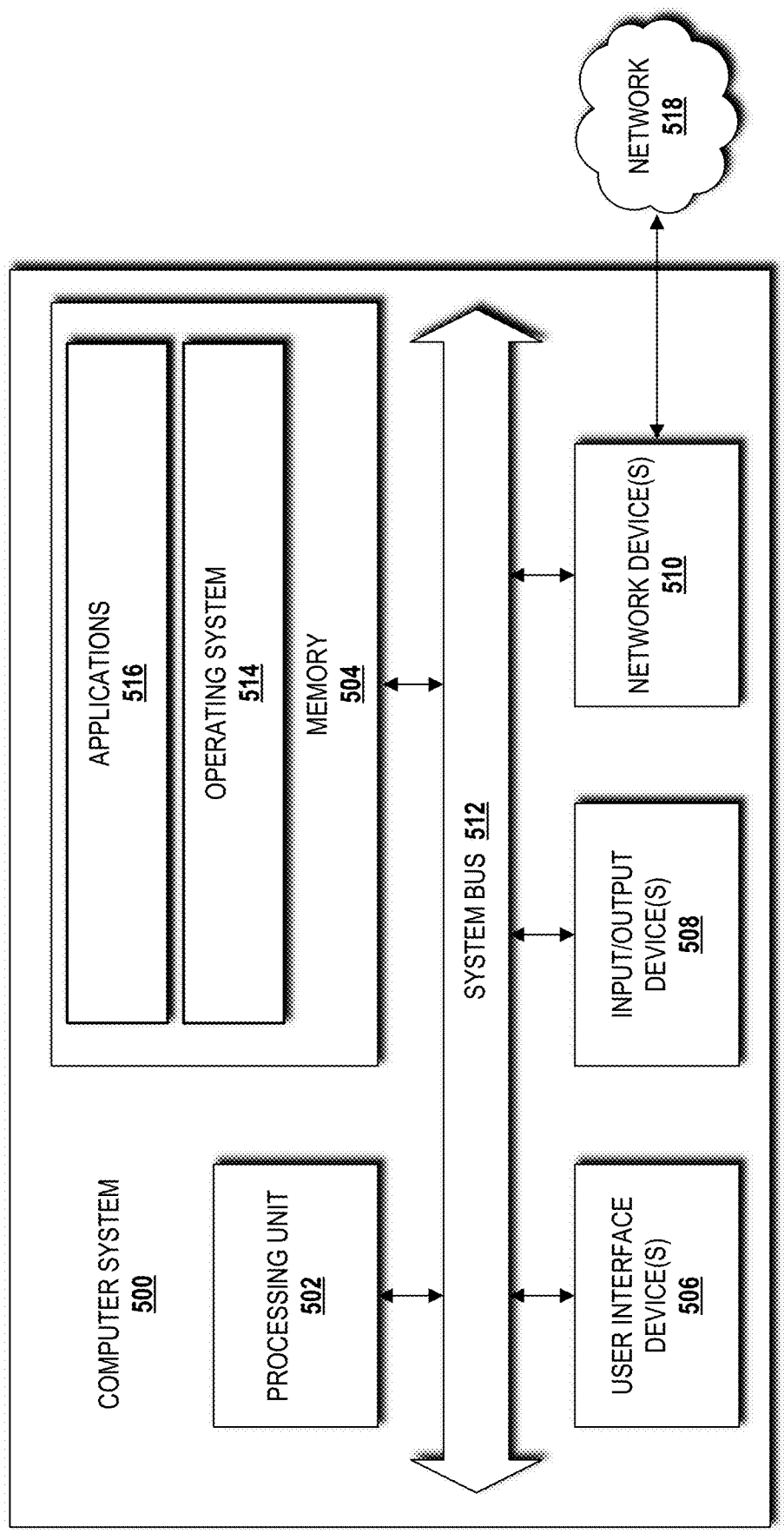
FIG. 5 is a block diagram illustrating an example computer system capable of implementing aspects of the embodiments presented herein.

FIG. 5 is a block diagram illustrating a computer system 500 configured to perform various operations disclosed herein. The computer system 500 includes a processing unit 502, a memory 504, one or more user interface devices 506, one or more input/output ("I/O") devices 508, and one or more network devices 510, each of which is operatively connected to a system bus 512. The system bus 512 enables bi-directional communication between the processing unit 502, the memory 504, the user interface devices 506, the I/O devices 508, and the network devices 510. In some embodiments, the user device 104, one or more components of the connected car 106, one or more components of the RAN 108 (e.g., one or more of the base stations 112), one or more components of the network 114, the OTA file distribution system 116, the profile creator 118, the network performance estimator 120, the file server 122, the OTA scheduler 124, the OTA on-road simulator/monitor 126, the network performance analyzer 128, or some combination thereof is/are configured, at least in part, like the computer system 500. It should be understood, however, that one or more of these elements may include additional functionality or include less functionality than now described.

The processing unit 502 may be a standard central processor that performs arithmetic and logical operations, a more specific purpose programmable logic controller ("PLC"), a programmable gate array, or other type of processor known to those skilled in the art and suitable for controlling the operation of the computer system 500. Processing units are generally known, and therefore are not described in further detail herein.

The memory 504 communicates with the processing unit 502 via the system bus 512. In some embodiments, the memory 504 is operatively connected to a memory controller (not shown) that enables communication with the processing unit 502 via the system bus 512. The illustrated memory 504 includes an operating system and one or more applications 516.

The operating system 514 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The user interface devices 506 may include one or more devices with which a user accesses the computer system 500. The user interface devices 506 may include, but are not limited to, computers, servers, personal digital assistants, telephones (e.g., cellular, IP, or landline), or any suitable computing devices. The I/O devices 508 enable a user to interface with the program modules. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, a touchscreen, or an electronic stylus. Further, the I/O devices 508 may include one or more output devices, such as, but not limited to, a display screen or a printer.

The network devices 510 enable the computer system 500 to communicate with other networks or remote systems via a network 518 (e.g., the network 114). Examples of the network devices 510 include, but are not limited to, a modem, a radio frequency ("RF") or infrared ("IR") transceiver, a telephonic interface, a bridge, a router, or a network card. The network 518 may include a wireless network such as, but not limited to, a WLAN such as a WI-FI network, a WWAN, a wireless PAN ("WPAN") such as BLUETOOTH, or a wireless MAN ("WMAN"). Alternatively, the network 518 may be a wired network such as, but not limited to, a WAN such as the Internet, a LAN such as the Ethernet, a wired PAN, or a wired MAN.

Figure 6:
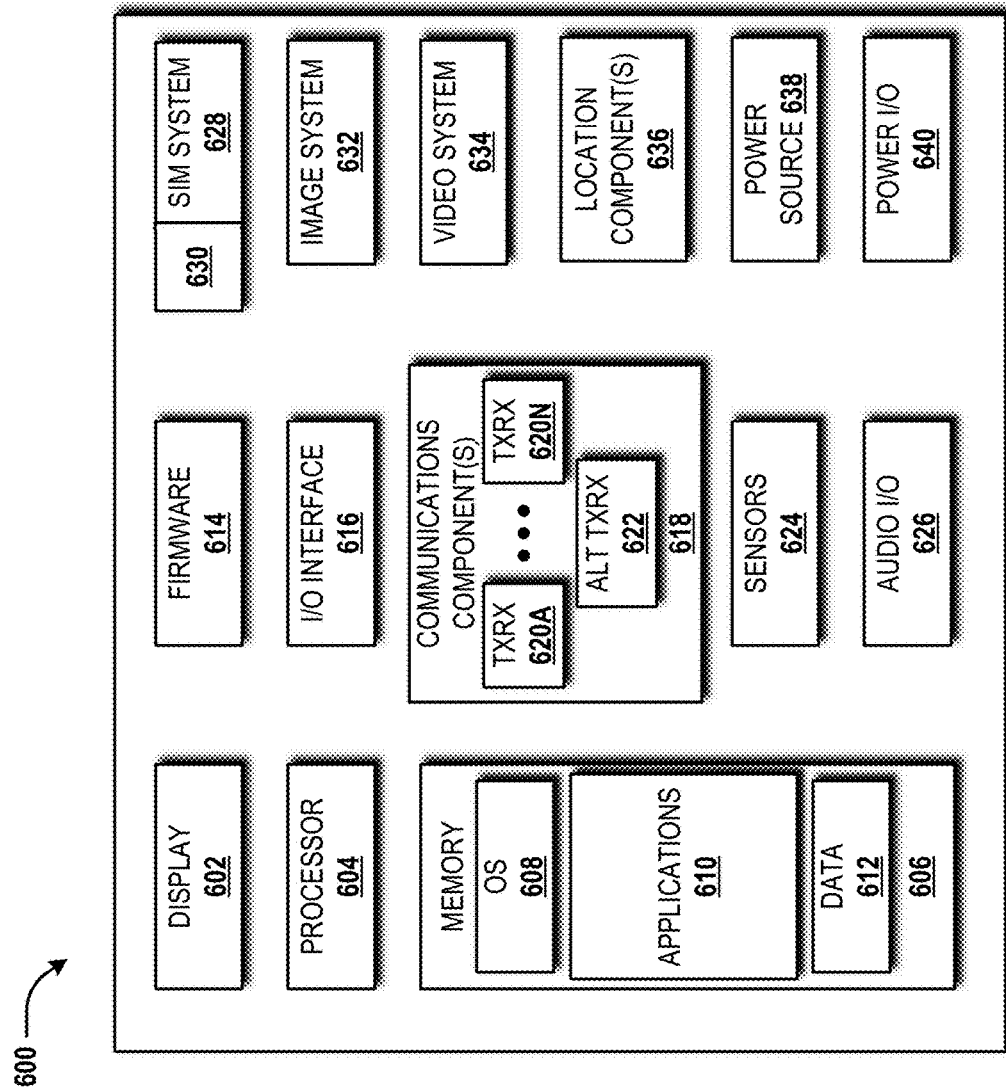
FIG. 6 is a block diagram illustrating an example mobile device capable of implementing aspects of the embodiments disclosed herein.

Turning now to FIG. 6, an illustrative mobile device 600 and components thereof will be described. In some embodiments, the user device 104 described above with reference to FIG. 1 can be configured as and/or can have an architecture similar or identical to the mobile device 600 described herein in FIG. 6. It should be understood, however, that the user device 104 may or may not include the functionality described herein with reference to FIG. 6. While connections are not shown between the various components illustrated in FIG. 6, it should be understood that some, none, or all of the components illustrated in FIG. 6 can be configured to interact with one another to carry out various device functions. In some embodiments, the components are arranged so as to communicate via one or more busses (not shown). Thus, it should be understood that FIG. 6 and the following description are intended to provide a general understanding of a suitable environment in which various aspects of embodiments can be implemented, and should not be construed as being limiting in any way.

As illustrated in FIG. 6, the mobile device 600 can include a display 602 for displaying data. According to various embodiments, the display 602 can be configured to display network connection information, various graphical user interface ("GUI") elements, text, images, video, virtual keypads and/or keyboards, messaging data, notification messages, metadata, Internet content, device status, time, date, calendar data, device preferences, map and location data, combinations thereof, and/or the like. The mobile device 600 also can include a processor 604 and a memory or other data storage device ("memory") 606. The processor 604 can be configured to process data and/or can execute computer-executable instructions stored in the memory 606. The computer-executable instructions executed by the processor 604 can include, for example, an operating system 608, one or more applications 610, other computer-executable instructions stored in the memory 606, or the like. In some embodiments, the applications 610 also can include a UI application (not illustrated in FIG. 6).

The UI application can interface with the operating system 608 to facilitate user interaction with functionality and/or data stored at the mobile device 600 and/or stored elsewhere. In some embodiments, the operating system 608 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 604 to aid a user in data communications, entering/deleting data, entering and setting user IDs and passwords for device access, configuring settings, manipulating content and/or settings, multimode interaction, interacting with other applications 610, and otherwise facilitating user interaction with the operating system 608, the applications 610, and/or other types or instances of data 612 that can be stored at the mobile device 600.

The applications 610, the data 612, and/or portions thereof can be stored in the memory 606 and/or in a firmware 614, and can be executed by the processor 604. The firmware 614 also can store code for execution during device power up and power down operations. It can be appreciated that the firmware 614 can be stored in a volatile or non-volatile data storage device including, but not limited to, the memory 606 and/or a portion thereof.

The mobile device 600 also can include an input/output ("I/O") interface 616. The I/O interface 616 can be configured to support the input/output of data such as location information, presence status information, user IDs, passwords, and application initiation (start-up) requests. In some embodiments, the I/O interface 616 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 600 can be configured to synchronize with another device to transfer content to and/or from the mobile device 600. In some embodiments, the mobile device 600 can be configured to receive updates to one or more of the applications 610 via the I/O interface 616, though this is not necessarily the case. In some embodiments, the I/O interface 616 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 616 may be used for communications between the mobile device 600 and a network device or local device.

The mobile device 600 also can include a communications component 618. The communications component 618 can be configured to interface with the processor 604 to facilitate wired and/or wireless communications with one or more networks described herein. In some embodiments, the communications component 618 includes a multimode communications subsystem for facilitating communications via the cellular network and one or more other networks.

The communications component 618, in some embodiments, includes one or more transceivers. The one or more transceivers, if included, can be configured to communicate over the same and/or different wireless technology standards with respect to one another. For example, in some embodiments, one or more of the transceivers of the communications component 618 may be configured to communicate using GSM, CDMAONE, CDMA2000, LTE, and various other 2G, 2.5G, 3G, 4G, 4.5G, and greater generation technology standards. Moreover, the communications component 618 may facilitate communications over various channel access methods (which may or may not be used by the aforementioned standards) including, but not limited to, TDMA, FDMA, W-CDMA, OFDM, SDMA, and the like.

In addition, the communications component 618 may facilitate data communications using GPRS, EDGE, the HSPA protocol family including HSDPA, EUL or otherwise termed HSUPA, HSPA+, and various other current and future wireless data access standards. In the illustrated embodiment, the communications component 618 can include a first transceiver ("TxRx") 620A that can operate in a first communications mode (e.g., GSM). The communications component 618 also can include an $N^{th}$ transceiver ("TxRx") 620N that can operate in a second communications mode relative to the first transceiver 620A (e.g., UMTS). While two transceivers 620A-620N (hereinafter collectively and/or generically referred to as "transceivers 620") are shown in FIG. 6, it should be appreciated that less than two, two, and/or more than two transceivers 620 can be included in the communications component 618.

The communications component 618 also can include an alternative transceiver ("Alt TxRx") 622 for supporting other types and/or standards of communications. According to various contemplated embodiments, the alternative transceiver 622 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 618 also can facilitate reception from terrestrial radio networks, digital satellite radio networks, internet-based radio service networks, combinations thereof, and the like. The communications component 618 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 600 also can include one or more sensors 624. The sensors 624 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 600 may be provided by an audio I/O component 626. The audio I/O component 626 of the mobile device 600 can include one or more speakers for the output of audio signals, one or more microphones for the collection and/or input of audio signals, and/or other audio input and/or output devices.

The illustrated mobile device 600 also can include a subscriber identity module ("SIM") system 628. The SIM system 628 can include a universal SIM ("USIM"), a universal integrated circuit card ("UICC") and/or other identity devices. The SIM system 628 can include and/or can be connected to or inserted into an interface such as a slot interface 630. In some embodiments, the slot interface 630 can be configured to accept insertion of other identity cards or modules for accessing various types of networks. Additionally, or alternatively, the slot interface 630 can be configured to accept multiple subscriber identity cards. Because other devices and/or modules for identifying users and/or the mobile device 600 are contemplated, it should be understood that these embodiments are illustrative, and should not be construed as being limiting in any way.

The mobile device 600 also can include an image capture and processing system 632 ("image system"). The image system 632 can be configured to capture or otherwise obtain photos, videos, and/or other visual information. As such, the image system 632 can include cameras, lenses, charge-coupled devices ("CCDs"), combinations thereof, or the like. The mobile device 600 may also include a video system 634. The video system 634 can be configured to capture, process, record, modify, and/or store video content. Photos and videos obtained using the image system 632 and the video system 634, respectively, may be added as message content to an MMS message, email message, and sent to another device. The video and/or photo content also can be shared with other devices via various types of data transfers via wired and/or wireless communication devices as described herein.

The mobile device 600 also can include one or more location components 636. The location components 636 can be configured to send and/or receive signals to determine a geographic location of the mobile device 600. According to various embodiments, the location components 636 can send and/or receive signals from global positioning system ("GPS") devices, assisted-GPS ("A-GPS") devices, WI-FI/ WIMAX and/or cellular network triangulation data, combinations thereof, and the like. The location component 636 also can be configured to communicate with the communications component 618 to retrieve triangulation data for determining a location of the mobile device 600. In some embodiments, the location component 636 can interface with cellular network nodes, telephone lines, satellites, location transmitters and/or beacons, wireless network transmitters and receivers, combinations thereof, and the like. In some embodiments, the location component 636 can include and/or can communicate with one or more of the sensors 624 such as a compass, an accelerometer, and/or a gyroscope to determine the orientation of the mobile device 600. Using the location component 636, the mobile device 600 can generate and/or receive data to identify its geographic location, or to transmit data used by other devices to determine the location of the mobile device 600. The location component 636 may include multiple components for determining the location and/or orientation of the mobile device 600.

The illustrated mobile device 600 also can include a power source 638. The power source 638 can include one or more batteries, power supplies, power cells, and/or other power subsystems including alternating current ("AC") and/ or direct current ("DC") power devices. The power source 638 also can interface with an external power system or charging equipment via a power I/O component 640. Because the mobile device 600 can include additional and/or alternative components, the above embodiment should be understood as being illustrative of one possible operating environment for various embodiments of the concepts and technologies described herein. The described embodiment of the mobile device 600 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 600 or other devices or computers described herein, such as the computer system 600 described above with reference to FIG. 6. For purposes of the claims, the phrase "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 600 in order to store and execute the software components presented herein. It is also contemplated that the mobile device 600 may not include all of the components shown in FIG. 6, may include other components that are not explicitly shown in FIG. 6, or may utilize an architecture completely different than that shown in FIG. 6.

Figure 7:
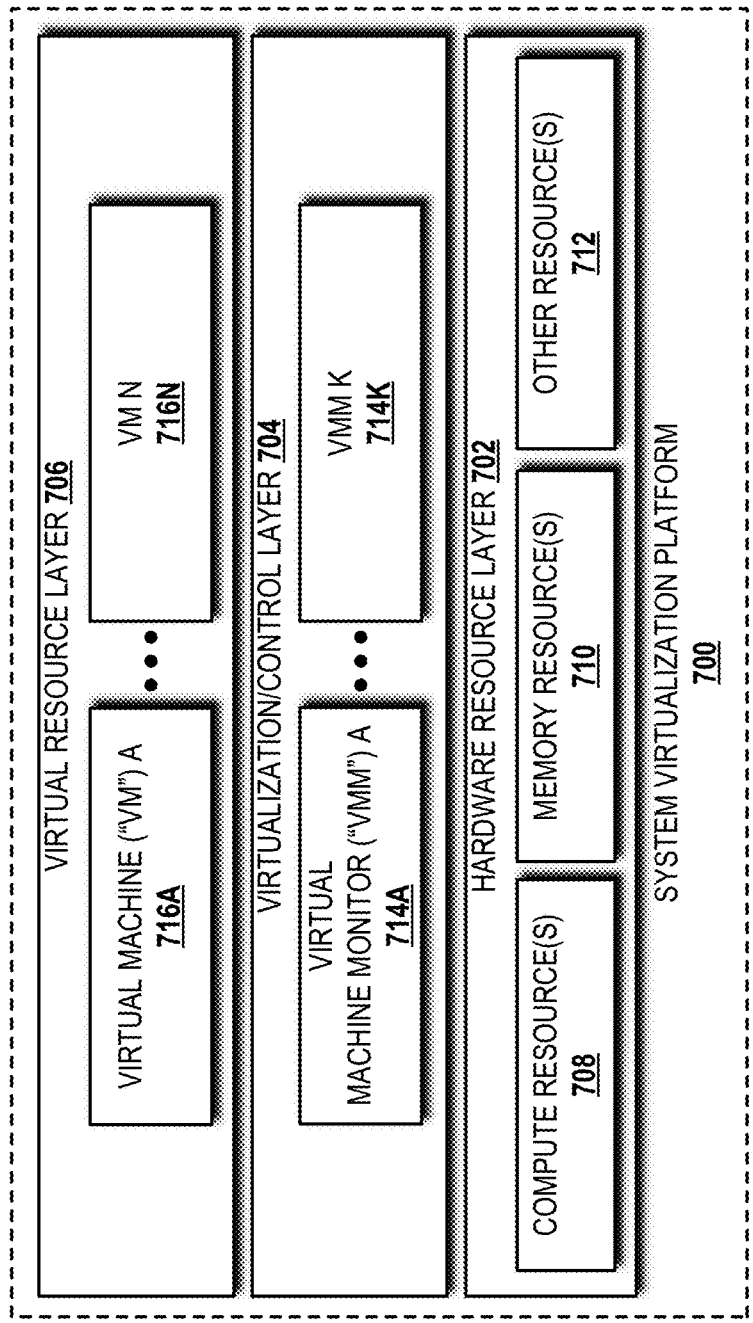
FIG. 7 is a block diagram illustrating an example network functions virtualization platform ("NFVP") capable of implementing aspects of the embodiments presented herein.

Turning now to FIG. 7, a system virtualization platform 700 will be described, according to an exemplary embodiment. The architecture of the system virtualization platform 700 can be used to implement virtualized devices and/or systems as virtual counterparts to physical network functions disclosed herein. The system virtualization platform 700 can be utilized to implement, at least in part, components of the RAN 108, the network 114, the OTA file distribution system 116, the profile creator 118, the network performance estimator 120, the file server 122, the OTA scheduler 124, the OTA on-road simulator/monitor 126, the network performance analyzer 128, or some combination thereof as virtualized versions of the physical devices and systems described herein. The system virtualization platform 700 is a shared infrastructure that can support multiple services and network applications. The illustrated system virtualization platform 700 includes a hardware resource layer 702, a virtualization/control layer 704, and a virtual resource layer 706 that work together to perform operations as will be described in detail herein.

The hardware resource layer 702 provides hardware resources, which, in the illustrated embodiment, include one or more compute resources 708, one or more memory resources 710, and one or more other resources 712. The compute resource(s) 708 can include one or more hardware components that perform computations to process data, and/or to execute computer-executable instructions of one or more application programs, operating systems, and/or other software. The compute resources 708 can include one or more central processing units ("CPUs") configured with one or more processing cores. The compute resources 708 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 708 can include one or more discrete GPUs. In some other embodiments, the compute resources 708 can include CPU and GPU components that are configured in accordance with a co-processing CPU/GPU computing model, wherein the sequential part of an application executes on the CPU and the computationally-intensive part is accelerated by the GPU. The compute resources 708 can include one or more system-on-chip ("SoC") components along with one or more other components, including, for example, one or more of the memory resources 710, and/or one or more of the other resources 712. In some embodiments, the compute resources 708 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 708 can be or can include one or more hardware components architected in accordance with an ARM architecture, available for license from ARM HOLDINGS of Cambridge, United Kingdom. Alternatively, the compute resources 708 can be or can include one or more hardware components architected in accordance with an x89 architecture, such an architecture available from INTEL CORPORATION of Mountain View, Calif., and others. Those skilled in the art will appreciate the implementation of the compute resources 708 can utilize various computation architectures, and as such, the compute resources 708 should not be construed as being limited to any particular computation architecture or combination of computation architectures, including those explicitly disclosed herein.

The memory resource(s) 710 can include one or more hardware components that perform storage operations, including temporary or permanent storage operations. In some embodiments, the memory resource(s) 710 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 708.

The other resource(s) 712 can include any other hardware resources that can be utilized by the compute resources(s) 708 and/or the memory resource(s) 710 to perform operations described herein. The other resource(s) 712 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 702 can be virtualized by one or more virtual machine monitors ("VMMs") 714A-714K (also known as "hypervisors"; hereinafter "VMMs 714") operating within the virtualization/control layer 704 to manage one or more virtual resources that reside in the virtual resource layer 706. The VMMs 714 can be or can include software, firmware, and/or hardware that alone or in combination with other software, firmware, and/or hardware, manages one or more virtual resources operating within the virtual resource layer 706.

The virtual resources operating within the virtual resource layer 706 can include abstractions of at least a portion of the compute resources 708, the memory resources 710, the other resources 712, or any combination thereof. These abstractions are referred to herein as virtual machines ("VMs"). In the illustrated embodiment, the virtual resource layer 706 includes VMs 716A-716N (hereinafter "VMs 716"). Each of the VMs 716 can execute one or more software applications, such as, for example, software application including instructions to implement, at least in part, one or more components of the network 114.

Figure 8:
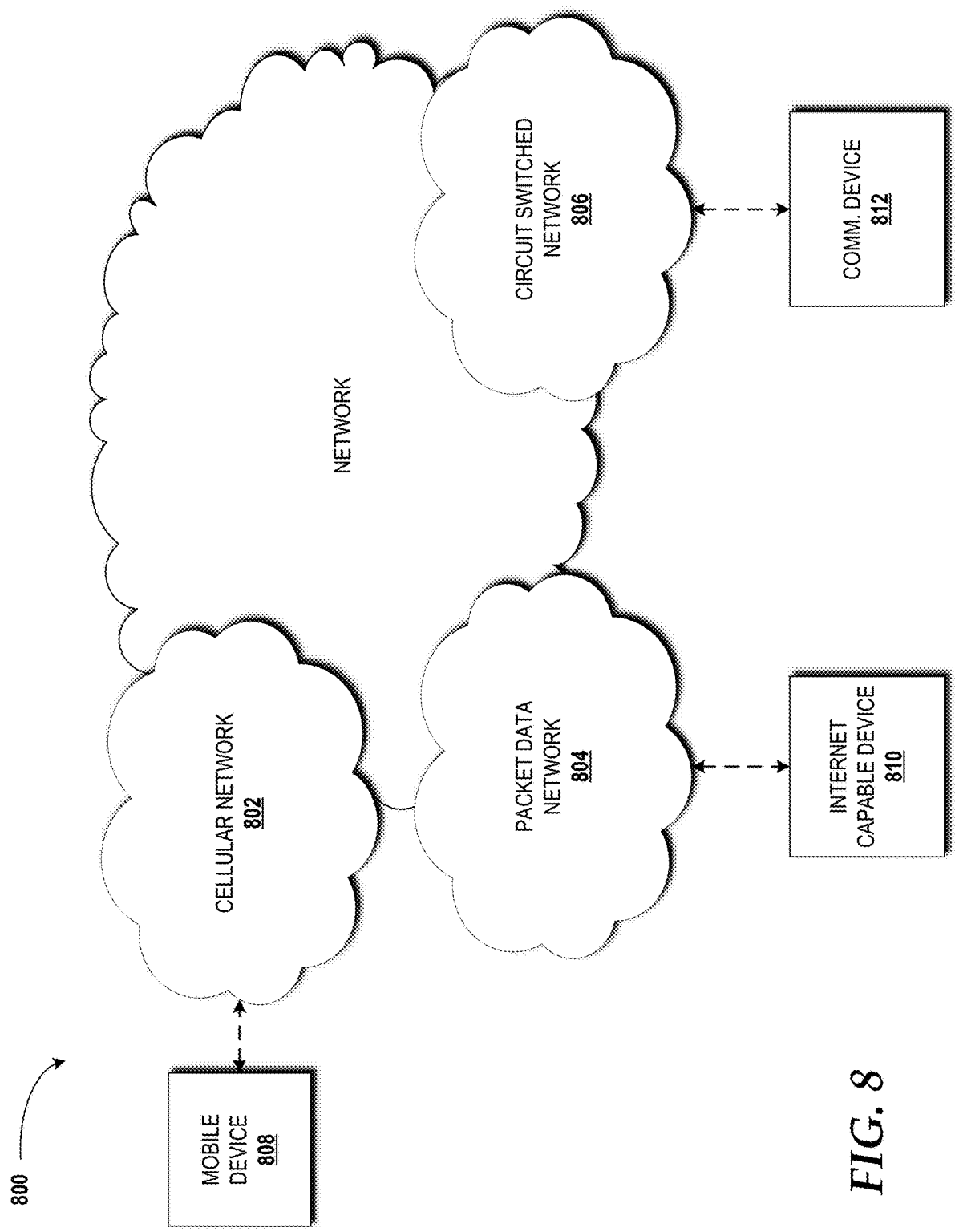
FIG. 8 is a diagram illustrating a network, according to an illustrative embodiment.

Turning now to FIG. 8, details of a network 800 are illustrated, according to an illustrative embodiment. The network 800 includes a cellular network 802, a packet data network 804, and a circuit switched network 806 (e.g., a public switched telephone network). The network 800 can include the network 114 illustrated and described with reference to FIG. 1.

The cellular network 802 includes various components such as, but not limited to, the RAN 108, the base stations 112, base transceiver stations ("BTSs"), NodeBs or eNodeBs, base station controllers ("BSCs"), radio network controllers ("RNCs"), mobile switching centers ("MSCs"), mobility management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, and the like. The cellular network 802 also includes radios and nodes for receiving and transmitting voice, data, and combinations thereof to and from radio transceivers, networks, the packet data network 804, and the circuit switched network 806.

A mobile communications device 806, such as, for example, a cellular telephone, a user equipment, a mobile terminal, a PDA, a laptop computer, a handheld computer, the user device 104, the connected car 106, and combinations thereof, can be operatively connected to the cellular network 802. The cellular network 802 can be configured as a 2G GSM network and can provide data communications via GPRS and/or EDGE. Additionally, or alternatively, the cellular network 802 can be configured as a 3G UMTS network and can provide data communications via the HSPA protocol family, for example, HSDPA, EUL (also referred to as HSUPA), and HSPA+. The cellular network 802 also is compatible with 4G mobile communications standards such as LTE, or the like, as well as evolved and future mobile standards.

The packet data network 804 includes various devices, for example, servers, computers, databases, and other devices in communication with one another, as is generally known. In some embodiments, the packet data network 804 is or includes one or more WI-FI networks, each of which can include one or more WI-FI access points, routers, switches, and other WI-FI network components. The packet data network 804 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 804 includes or is in communication with the Internet. The circuit switched network 806 includes various hardware and software for providing circuit switched communications. The circuit switched network 806 may include, or may be, what is often referred to as a plain old telephone system ("POTS"). The functionality of a circuit switched network 806 or other circuit-switched network are generally known and will not be described herein in detail.

The illustrated cellular network 802 is shown in communication with the packet data network 804 and a circuit switched network 806, though it should be appreciated that this is not necessarily the case. One or more Internet-capable devices 810, for example, a PC, a laptop, a portable device, or another suitable device, can communicate with one or more cellular networks 802, and devices connected thereto, through the packet data network 804. It also should be appreciated that the Internet-capable device 810 can communicate with the packet data network 804 through the circuit switched network 806, the cellular network 802, and/or via other networks (not illustrated).

As illustrated, a communications device 812, for example, a telephone, facsimile machine, modem, computer, or the like, can be in communication with the circuit switched network 806, and therethrough to the packet data network 804 and/or the cellular network 802. It should be appreciated that the communications device 812 can be an Internet-capable device, and can be substantially similar to the Internet-capable device 810.

Based on the foregoing, it should be appreciated that concepts and technologies for the optimization of OTA file distribution for connected cars based upon a heuristic scheduling algorithm have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the subject disclosure.

The invention claimed is:

1. An over-the-air file distribution system comprising:
a processor; and
a memory that stores instructions that, when executed by the processor, cause the processor to perform operations comprising
determining, based upon a scheduling algorithm, a schedule by which a file is to be distributed over-the-air to a plurality of connected cars, wherein the scheduling algorithm utilizes a schedule time requirement that specifies a number of ignition cycles within which download of the file is to be completed,
obtaining the file, and
distributing, over-the-air, the file to the plurality of connected cars in accordance with the schedule.

2. The over-the-air file distribution system of claim 1, wherein the scheduling algorithm utilizes an additional schedule time requirement that specifies a percentage of the plurality of connected cars to be scheduled to receive the file over-the-air within a defined time window after the file is made available.

3. The over-the-air file distribution system of claim 1, wherein the scheduling algorithm utilizes an over-the-air download requirement that specifies a network over which the file is to be downloaded.

4. The over-the-air file distribution system of claim 3, wherein the network comprises a cellular network or a WI-FI network.

5. The over-the-air file distribution system of claim 4, wherein the scheduling algorithm minimizes a number of the plurality of connected cars that are permitted to be connected to a same cell in the cellular network.

6. The over-the-air file distribution system of claim 1, wherein the operations further comprise simulating performance of the scheduling algorithm prior to distributing, over-the-air, the file to the plurality of connected cars in accordance with the schedule.

7. A method comprising:
determining, by an over-the-air file distribution system comprising a processor, based upon a scheduling algorithm, a schedule by which a file is to be distributed over-the-air to a plurality of connected cars, wherein the scheduling algorithm utilizes a schedule time requirement that specifies a number of ignition cycles within which download of the file is to be completed;
obtaining, by the over-the-air file distribution system, the file; and
distributing, by the over-the-air file distribution system, over-the-air, the file to the plurality of connected cars in accordance with the schedule.

8. The method of claim 7, wherein the scheduling algorithm utilizes an additional schedule time requirement that specifies a percentage of the plurality of connected cars to be scheduled to receive the file over-the-air within a defined time window after the file is made available.

9. The method of claim 7, wherein the scheduling algorithm utilizes an over-the-air download requirement that specifies a network over which the file is to be downloaded.

10. The method of claim 9, wherein the network comprises a cellular network or a WI-FI network.

11. The method of claim 10, wherein the scheduling algorithm minimizes a number of the plurality of connected cars that are permitted to be connected to a same cell in the cellular network.

12. The method of claim 7, further comprising simulating performance of the scheduling algorithm prior to distributing, over-the-air, the file to the plurality of connected cars in accordance with the schedule.

13. A computer-readable storage medium comprising computer-executable instructions that, when executed by a processor, causes the processor to perform operations comprising:
determining, based upon a scheduling algorithm, a schedule by which a file is to be distributed over-the-air to a plurality of connected cars, wherein the scheduling algorithm utilizes a schedule time requirement that specifies a number of ignition cycles within which download of the file is to be completed;
obtaining the file; and
distributing, over-the-air, the file to the plurality of connected cars in accordance with the schedule.

14. The computer-readable storage medium of claim 13, wherein the scheduling algorithm utilizes an additional schedule time requirement that specifies a percentage of the plurality of connected cars to be scheduled to receive the file over-the-air within a defined time window after the file is made available.

15. The computer-readable storage medium of claim 13, wherein the scheduling algorithm utilizes an over-the-air download requirement that specifies a network over which the file is to be downloaded; wherein the network comprises a cellular network or a WI-FI network.

16. The computer-readable storage medium of claim 15, wherein the scheduling algorithm minimizes a number of the plurality of connected cars that are permitted to be connected to a same cell in the cellular network.

17. The computer-readable storage medium of claim 13, wherein the operations further comprise simulating performance of the scheduling algorithm prior to distributing, over-the-air, the file to the plurality of connected cars in accordance with the schedule.

* * * * *